United States Patent
Santhanam et al.

(10) Patent No.: US 8,954,679 B2
(45) Date of Patent: Feb. 10, 2015

(54) MANAGEMENT OF CACHED DATA BASED ON USER ENGAGEMENT

(71) Applicant: Facebook, Inc., Menlo Park, CA (US)

(72) Inventors: Sriya Santhanam, Mountain View, CA (US); Varun Kacholia, Mountain View, CA (US); Li Zhang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 173 days.

(21) Appl. No.: 13/765,057

(22) Filed: Feb. 12, 2013

(65) Prior Publication Data

US 2014/0229679 A1   Aug. 14, 2014

(51) Int. Cl.
*G06F 12/02* (2006.01)
*G06F 12/12* (2006.01)

(52) U.S. Cl.
CPC .................................. *G06F 12/121* (2013.01)
USPC ............ 711/135; 711/154; 711/156; 711/158

(58) Field of Classification Search
USPC ................... 711/135, 154, 156, 158
See application file for complete search history.

(56) References Cited

U.S. PATENT DOCUMENTS

| | | | | |
|---|---|---|---|---|
| 6,032,227 | A * | 2/2000 | Shaheen et al. | 711/129 |
| 7,349,943 | B2 * | 3/2008 | Lin et al. | 709/203 |
| 7,464,386 | B2 * | 12/2008 | Millington et al. | 719/331 |
| 7,523,191 | B1 * | 4/2009 | Thomas et al. | 709/224 |
| 7,779,058 | B2 * | 8/2010 | Shea | 707/705 |
| 7,958,234 | B2 * | 6/2011 | Thomas et al. | 709/224 |
| 8,005,643 | B2 * | 8/2011 | Tunkelang et al. | 702/179 |
| 8,024,327 | B2 * | 9/2011 | Tunkelang et al. | 707/722 |
| 8,051,073 | B2 * | 11/2011 | Tunkelang et al. | 707/722 |
| 8,051,084 | B2 * | 11/2011 | Tunkelang et al. | 707/737 |
| 8,095,764 | B1 * | 1/2012 | Bauer et al. | 711/170 |
| 8,151,077 | B1 * | 4/2012 | Bauer et al. | 711/170 |
| 8,219,593 | B2 * | 7/2012 | Tunkelang et al. | 707/803 |
| 8,527,515 | B2 * | 9/2013 | Zelevinsky et al. | 707/737 |
| 8,560,529 | B2 * | 10/2013 | Tunkelang et al. | 707/722 |
| 8,832,140 | B2 * | 9/2014 | Tunkelang et al. | 707/769 |
| 2007/0244739 | A1 * | 10/2007 | Soito et al. | 705/10 |
| 2008/0228821 | A1 * | 9/2008 | Mick et al. | 707/104.1 |
| 2009/0006383 | A1 * | 1/2009 | Tunkelang et al. | 707/5 |
| 2009/0006438 | A1 * | 1/2009 | Tunkelang et al. | 707/101 |
| 2009/0271514 | A1 * | 10/2009 | Thomas et al. | 709/224 |
| 2010/0306773 | A1 * | 12/2010 | Lee et al. | 718/1 |
| 2011/0082719 | A1 * | 4/2011 | Dutta | 705/7.29 |
| 2011/0087603 | A1 * | 4/2011 | Garcia et al. | 705/55 |
| 2012/0054440 | A1 * | 3/2012 | Doig et al. | 711/122 |
| 2012/0124032 | A1 * | 5/2012 | Zelevinsky et al. | 707/722 |
| 2012/0203639 | A1 * | 8/2012 | Webster et al. | 705/14.66 |
| 2012/0278321 | A1 * | 11/2012 | Traub et al. | 707/736 |
| 2013/0125008 | A1 * | 5/2013 | Irvine | 715/739 |
| 2014/0040285 | A1 * | 2/2014 | Rubinstein et al. | 707/751 |
| 2014/0214861 | A1 * | 7/2014 | Zheng et al. | 707/749 |

* cited by examiner

*Primary Examiner* — Stephen Elmore
(74) *Attorney, Agent, or Firm* — Fenwick & West LLP

(57) ABSTRACT

A social data aggregator generates entries of action data describing actions taken by users. A portion of the entries are stored in an action cache to expedite retrieval. To store more recent or relevant entries in the action cache, entries are removed from the action cache based on engagement scores associated with the entries. An engagement score indicates a likelihood of a user requesting content interacting with a notification based on an entry. Entries having the lowest engagement scores or having engagement scores below a threshold are removed from the action cache.

18 Claims, 3 Drawing Sheets

MANAGEMENT OF CACHED DATA BASED ON USER ENGAGEMENT

BACKGROUND

This invention relates generally to data caching, in particular, to caching data describing actions in a social networking system.

Social networking systems allow users to form connections with other users and to share information with those other users (often called "friends" or "connections"). Examples of shared information include text data, photos, videos, web links, or any other suitable type of information. Information communicated via social networking systems is often distributed from one user to multiple users. For example, a single social networking system user may post a photo for presentation to dozens, hundreds, or even thousands of other users connected to the user.

Additionally, information communicated from a user to other users via the social networking system is typically not a one-time communication like email, but rather is archived for display to users of the social networking system at any time. For example, social networking systems store information about the latest actions performed by users connected to a user, allowing the user to retrieve the stored information at any time. Examples of actions include posting of content such as photos, videos, and text, as well as attending events, dining at restaurants, participating in sports, etc. As any user may potentially be a connection to any other user storing information for notifying users of actions grows in complexity as the number of users and the number of users connected to a user increase.

As the number of users of social networking systems has continually grown, the task of providing timely and updated notifications of actions to users has grown exponentially. Users are now sharing increasing amounts of information through social networking system users on a daily basis, and each user's information is being shared with an increasing number of additional users. Accordingly, social networking systems face increasing difficulty in aggregating relevant information for notifying their users. As a user may be connected to hundreds or even thousands of other users, social networking systems may potentially have to retrieve data from hundreds or even thousands of different data stores to provide a user with recent information about other users connected to the user.

Rather than retrieve data in real-time, some social networking systems provide their users with notifications of actions that do not reflect the most recent actions by social networking system users. Other social networking systems do not even attempt to generate notifications identifying actions of all users connected to a user, but rather notify the user of actions performed by a subset of users connected to the user. However, such approaches to providing notifications do not provide a user with current information about actions taken by users connected to the user.

SUMMARY

A social networking system includes a social data aggregator receiving data from client devices describing actions performed by users operating the client devices. An action logger generates an action log describing the actions. At least some data from the action log is cached in an action cache, which is high performance storage such as a memory-resident database. Data in the action cache is more quickly accessible than other data from the action log that may be stored in distributed remote data hosts. To maintain the most relevant information about actions in the action cache, the social data aggregator includes a cache manager that purges information from the action cache based on engagement scores for the data in the action cache. An engagement score measures predicted interaction with data describing actions when displayed to users. The cache manager selects data from the action cache having engagement scores less than a threshold value or having the lowest engagement scores and removes the selected data from the action cache. In one embodiment, the cache manager also executes application-specific rules through a rules engine to prioritize certain data describing actions based on its content.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
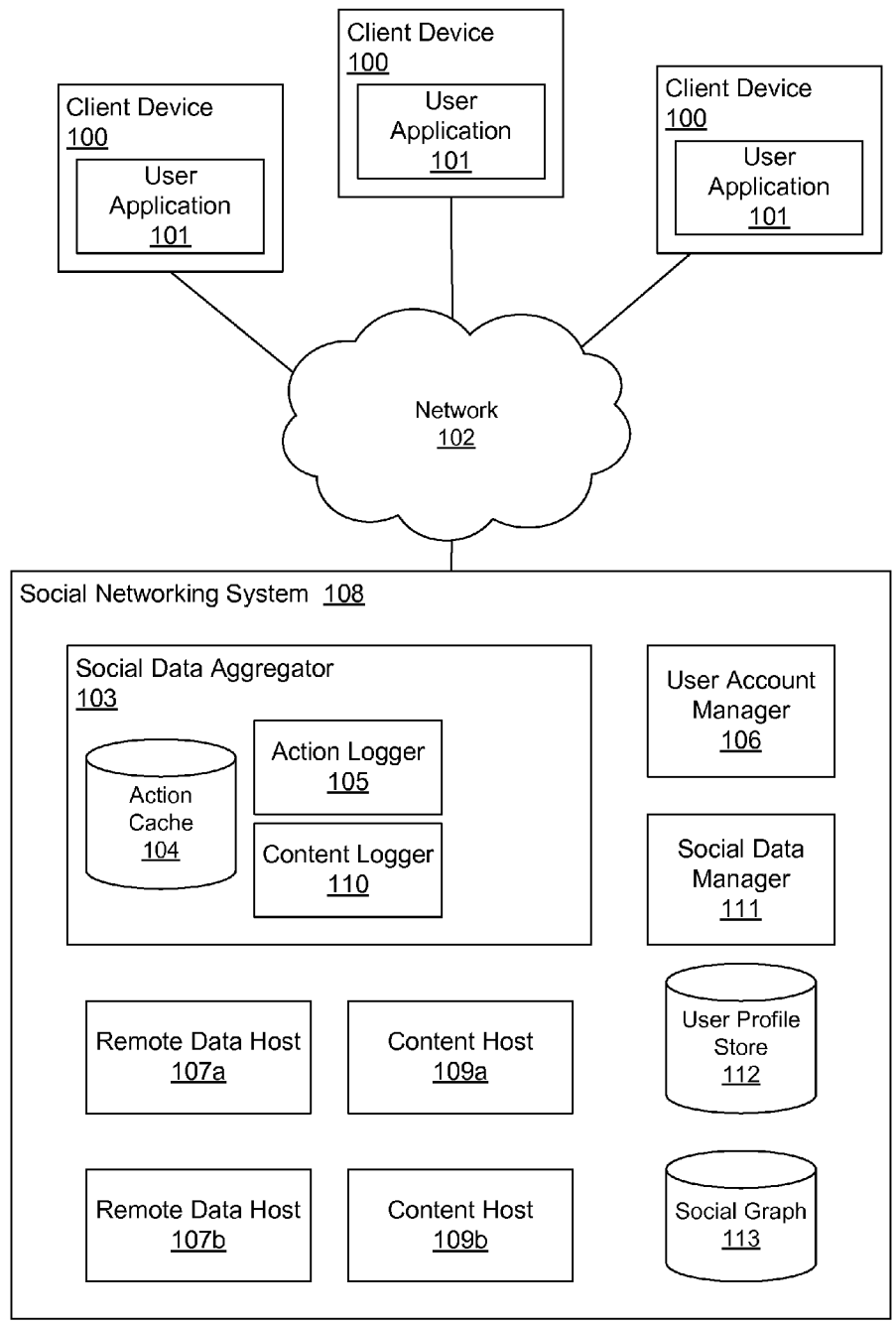
FIG. 1 is a block diagram of a system environment including a social networking system, in accordance with one embodiment.

FIG. 1 shows a block diagram of one embodiment of a system environment including a social networking system 108. The system environment shown by FIG. 1 includes a social networking system 108 connected to one or more client devices 100 via a network 102. In other embodiments, the system environment may include different and/or additional components than those shown by FIG. 1.

The network 102 enables communications between the client devices 100 and the social networking system 108. In one embodiment, the network 102 uses standard communications technologies and/or protocols. Examples of communications technologies used by the network 102 include Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc. In one embodiment the network 102 is the Internet.

The social networking system 108 stores data associated with users and allows users to communicate and interact with each other. For example, the social networking system 108 allows a user to establish an account and a user profile. Users of the social networking system 108 also establish connections with other social networking system users. The users connected to a user may be referred to as the user's "connections" or "friends." The social networking system 108 may present information about a user to that user's connections via a user profile page that displays information from the user profile. A user may create messages or upload content presented to other users through any suitable communication channel, such as through presentation on the user's profile page. When a user performs actions via the social networking system 108, the social networking system 108 may send a notification to users connected to the user of the actions. Examples of actions include uploading data to the social networking system 108, posting a message to a profile page, posting content to another page of the social networking system 108, checking in at a location, operating an application, or any other suitable type of interaction. A description of each user's activities may be logged by the social networking system 108 as action data. Based on the action data, notifications are generated for communication to users connected to the user performing the actions. The social networking system 108 may also send notifications to users about messages or content from brands, companies, artists, applications, or other entities. These latter notifications are sometimes called "sponsored notifications" or "sponsored stories."

The client devices 100 are computing devices capable of processing data as well as transmitting and/or receiving data via the network 102. Examples of client devices 100 include mobile phones, desktop computers, laptop computers tablet computers, or other suitable devices. The client devices 100 may host user applications 101 allowing users operating a client device 100 to exchange data with the social networking system 108. The user applications 101 may be a web application comprising hypertext markup language (HTML) and JAVASCRIPT® code executing in a web browser, a native application executing on an operating system of the client device 101 (e.g., IOS® or ANDROID™), or any other suitable application format.

A user may view notifications received from the social networking system 108 via the user application 101 executing on the client device 100. Notifications may be presented to a user via a newsfeed including stories describing actions performed by other users connected to the user or via any other suitable communication channel. Stories in a newsfeed may describe the most recent actions performed by other users connected to the user and/or actions most likely to be relevant to the user. A story is an aggregation of social data gathered by the social networking system 108 sent to a client device 100 for display to the user. For example, a story is sent to the client device 100 by the social networking system 108 to inform a user about photographs recently uploaded by users connected to the user. In another example, a story may include one or more text summaries describing the actions of users connected to the user viewing the story. A user may interact with a story to request additional information from the social networking system 108 related to the story. The social networking system 108 may determine the relevance of social networking stories to a user before selecting stories to be sent to the user device operated by that user.

In the embodiment shown by FIG. 1, the social networking system 108 comprises a social data aggregator 103, a user account manager 106, social data manager 111, one or more remote data hosts 107, and one or more content hosts 109. However, in other embodiments, the social networking system 108 may include different and/or additional components than those shown by FIG. 1.

The user account manager 106 receives information from a user to establish an account with the social networking system 108. Additionally, the user account manager 106 confirms a user's identity when the user subsequently connects to the social networking system 108. Information provided by a user to the social networking system 108 is stored in a corresponding user profile maintained in the user profile store 112. The user account manager 106 may generate a unique identifier for each user that establishes an account with the social networking system 108, and this identifier may be associated with a user's user profile.

The social data manager 111 receives data describing connections between users and objects in the social networking system 108. Examples of objects maintained by the social networking system include content uploaded by users, events, locations, music, movies, or other information. Objects are stored in the social data manager 111 and may have different types. Examples of types of objects included in the social data manager 111 include photo objects, location objects, or other suitable data.

Objects may have one or more connections to other objects or users. The social data manager 111 stores information describing a connection as an edge. For example, a user may have a number of edges connected to photo objects including images of that user. In this example, the edges having a type indicating that the user is included in the images. Similarly, location objects may also be connected to photo objects by edges indicating the photos were taken at the locations.

The user profiles, objects and edges stored by the social networking system 108 may form an interconnected graph, or social graph 113, describing users, objects and the connections between objects and/or users. The social graph 113 includes nodes representing objects and users, with the nodes connected by the edges representing the relationships between various objects and/or users. By traversing edges between nodes, the social data manager 111 identifies relationships between objects and/or users. For example, if the social data manager 111 receives a request for photos of a user at a particular location, the social data manager traverses the social graph 113 to identify photo objects that are connected to the user's user profile by edges indicating the user is represented in the photo objects and are also connected to the location object of the identified location by an edge indicating that the photo was taken at the location.

The social data aggregator 103 receives requests for information (such as for notifications) from a client device 100, determines information relevant for a user identified by a request, and sends the determined information to the client device 100. The social data aggregator 103 also receives data from users including uploaded content. Examples of uploaded content include photos, videos, text messages, check-ins, reviews, instant messages, links, or other data. The data received from the users implicitly and explicitly provides information to the social data aggregator 103 describing actions performed by users. Based on the information describing actions performed by the users, the social data aggregator 103 determines the notifications of actions that are relevant for users.

The social data aggregator 103 comprises an action cache 104, an action logger 105, and a content logger 110. The content logger 110 receives content, such as photos, videos, messages, and other data, from users. Content received by the content logger 110 is communicated to the one or more content hosts 109a, 109b for storage. The content logger 110 may generate an identifier for each stored item of content and may also track the storage location of each item of content sent to a content hosts 109. The content logger 110 may also notify the social data manager 111 when new content is received, allowing the social graph 113 to be updated to include a node representing the new content as well as one or more edges to the user that uploaded the content, to users associated with the content, to locations associated with the content, or to other objects associated with the content. This allows the social graph 113 to be updated to include content received by the social networking system 108.

The action logger 105 processes communications from client devices 100 and identifies actions described by the communications. Action data describing actions identified from the communications is stored as entries in the action cache 104 and/or in one or more remote data hosts 107a, 107b. An entry of action data describes a performed action, a reference to the user that performed the action, a date when the action was taken or captured by the action logger 105, and one or more references to other users or objects associated with the action. For instance, if a user, John Smith, uploads a photo to the social networking system 108 in which another user Jane Doe is tagged, an entry of action data generated for this action includes one or more of: text or binary data indicating that John Smith has taken a photo of Jane Doe, a reference to the object representing John Smith in the social graph 113, a reference to the object representing Jane Doe in the social graph 113, a reference to an object in the social graph 113 indicating the location where the photo was taken, a reference to the photo stored in the content store 110, a reference to the object representing the photo in the social graph 113, and a date when the photo was taken.

As the action logger 105 generates entries of action data from data received from the client devices 100, these entries are stored in the action cache 104 and/or in the remote data hosts 107a, 107b. The action cache 104 is a storage media configured for more rapid retrieval of data than a remote data host 107; however, the action cache 104 typically has a smaller storage capacity than the remote data hosts 107a, 107b, so a limited number of entries of action data are stored in the action cache 104. In one embodiment the action cache 104 is a fast memory-resident database where entries of action data are stored in random access memory (RAM). Alternatively, the action cache 104 a database storing data in flash memory.

Hence, many entries of action data generated by the action logger 105 are stored by a remote data host 107. In one embodiment, each entry of action data is sent to the remote data hosts 107 for storage and a subset of the entries of action data are also stored in the action cache 104. The social data aggregator 103 computes an engagement score for each entry of action data and determines which entries of action data to store in the action cache 104 based at least in part on the engagement scores. Management of the action cache 104 is further described in conjunction with FIGS. 2 and 3.

Figure 2:
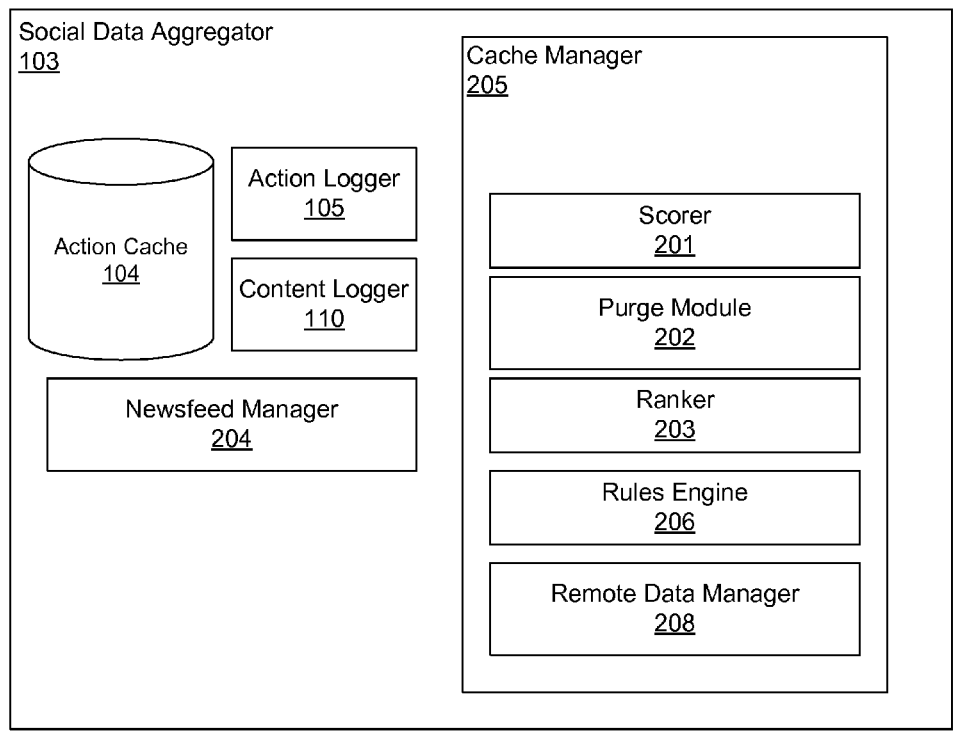
FIG. 2 is a block diagram of a social data aggregator, in accordance with one embodiment.

FIG. 2 is a block diagram of one embodiment of the social data aggregator 103. In addition to the components described above in conjunction with FIG. 1, the embodiment shown by FIG. 2 includes a newsfeed manager 204 and a cache manager 205. In other embodiments, different and/or additional components may be included in the social data aggregator 103.

The newsfeed manager 204 processes requests for notifications from social networking system users and generates notifications for the requesting social networking system users. To generate notifications, the newsfeed manager 204 requests entries of action data associated with users or objects connected to a requesting user from the cache manager 205. Based on entries of action data received from the cache manager 205, the newsfeed manager 204 generates a newsfeed including stories having information describing the entries of action data. The newsfeed is then sent to a client device 100 from which the request for notification was received for display.

The cache manager 205 ranks, filters, and manages entries of action data stored in the action cache 104. Additionally, the cache manager 205 manages the transfer of entries of action data between the action cache 104 and one or more remote data hosts 107a, 107b. The cache manager 205 also removes selected entries of action data from the action cache 104. For example, the cache manager 205 clears the action cache 104 when the action cache 104 includes a threshold number of entries of action data. In the embodiment shown by FIG. 2, the cache manager 205 comprises a scorer 201, a purge module 202, a ranker 203, a rules engine 206, and a remote data manager 208.

The scorer 201 determines an engagement score for each entry of action data stored in the action cache 104. The engagement score is a measure of the predicted level of interaction with a notification describing the entry of action data when displayed to a user requesting the notification. User interactions with a notification indicate a user's level of interest in the content described by the notification. Examples of interactions with a notification, used to determine an engagement score for an entry of action data included in the notification, include: a user accessing a notification, a user expressing a preference for a notification ("liking" a notification), sharing a notification with another user, requesting data about content of a notification, or other suitable actions.

The engagement score for an entry of action data may be based on both the historical engagement observed for previously presented notifications including the action data as well as the predicted engagement for a notification including the entry of action data. Additional information associated with an entry of action data may be used to determine the engagement score for the entry of action data. Examples of additional information associated with the entry of action data includes: the user that performed the action (an action generated by a user associated with other entries of action data having high engagement scores is also likely to have a high engagement score), users associated with the action (e.g., actions associated with popular users are likely to generate more interactions than actions associated with less popular users), the type of content associated with the action (e.g., photographs and video content are often more popular than text content), the date associated with the action (e.g., newer actions are often more likely to receive interactions than older actions), prior interactions with notifications including the entry of action data, or other suitable data.

Additional information about users or objects associated with an entry of action data may be used to generate an engagement score for the entry. For example, the engagement score may account for an affinity between a user to be presented with a notification and users or objects associated with the entry of action data represented by the notification. The affinity between a user and other users or objects may be included in the social graph 113. For example, the engagement score for an entry of action data accounts for the affinity between the user performing the action and other users connected to the user. Actions performed by users with higher affinities may receive higher engagement scores. Determining affinity between objects in a social networking system 108 is further described in U.S. application Ser. No. 12/978,265, filed on Dec. 23, 2010, which is incorporated by reference herein in its entirety.

The scorer 201 may use a machine-learned model to generate engagement scores based on one or more of the factors mentioned above. By observing the interactions between users and notifications including entries of action data and comparing the observed interactions to predicted engagement scores for entries of action data identified by the notifications, the machine-learned model may be adjusted to improve future scoring. Any suitable machine learning process may be used to modify engagement scores based on observed interactions with notifications.

In one embodiment, the scorer 201 generates engagement scores for entries of action data as they are generated by the action logger 105 and may update the engagement scores based on observed interactions with notifications. Alternatively, the scorer 201 generates engagement scores on demand; for example when a trigger event to purge the action cache 104 is received. The scorer 201 may decay the engagement scores of entries of action data based on the date associated with the action logs. For example, entries of action data associated with dates longer than a threshold time from a current time have their engagement scores lowered or entries of action data associated with dates within a threshold time from the current time have their engagement scores boosted. Time-based biasing of engagement scores is used to manage the entries of action data stored in the action cache 104, as described in more detail below.

The purge module 202 removes entries of action data from the action cache 104 in response to the social networking system 108 receiving a triggering event. Entries of action data may be removed from the action cache 104 by any suitable method, such as de-allocating, freeing, deleting, or de-indexing. Examples of trigger events include the number of entries of action data stored in the action cache 104 reaching a threshold entry level, the amount of data stored in the action cache 104 reaching a threshold data level, or another suitable event. Alternatively, the trigger event is a signal sent to the purge module 202 at regular periods or based on the rate at which the action logger 105 generates entries of action data. When a trigger event is received, the purge module 202 removes a subset of the entries of action data from the action cache 105. In one embodiment, the number of entries removed is based on a number of new entries of action data expected to be stored in the action cache 104 within a specified time period.

To identify entries of action data to remove from the action cache 104, the purge module 202 uses engagement scores associated with entries of action data in the action cache 104. In one embodiment, the purge module 202 identifies candidate entries of action data and selects a subset of the candidate entries for removal based on the engagement scores. For example, the candidate entries having the lowest engagement scores or having engagement scores below a threshold are selected. In one embodiment, the ranker 203 orders the candidate entries of action data or the entries of action data in the action cache 104 by engagement score to more easily identify entries for deletion. Engagement scores for entries of action data may be generated after a triggering event is received, so entries of action data are selected for removal based on recent engagement scores. The ranker 203 may update the rankings of entries of action data as new entries are stored in the action cache 104 and as engagement scores of action entries are updated.

In one embodiment, the purge module 202 selects candidate entries of action data based on application-specific rules executed by a rules engine 206. For example, application-specific rules identify entries of action data for prioritizing based on application-specific criteria and the purge module 202 identifies entries that are not prioritized as candidate entries of action data. A subset of candidate entries are selected based on the engagement scores of the candidate entries of action data; hence a limited number of entries of action data are removed from the action cache 104 when a trigger event is received. For example, if the social data aggregator 103 serves notifications to a user application 101 for viewing photos, application-specific rules may prioritize entries of action data related to photos over entries including other types of action data, allowing the purge module 202 to initially remove entries of action data unrelated to photos.

The purge module 202 may use additional information to select candidate entries of action data. For example, the purge module 202 may use a date associated with entries of action data to identify candidate entries if the rules engine 206 identifies less than a threshold number of candidate entries. For example, in the preceding photo application example, if less than a threshold number of candidate entries of action data not associated with photos are identified, entries of action data associated with photographs associated with the oldest dates are also selected as candidate entries. This may result in removal of entries of action data associated with photos that have the oldest date and lowest engagement scores from the action cache 104.

The remote data manager 208 sends entries of action data to one or more remote data hosts 107 for storage. Additionally, the remote data manager 208 may receive entries of action data from a remote data host 107 for storage in the action cache 104. When the purge module 202 identifies entries of action data to remove from the action cache 104, the remote data manager 208 may determine if the identified entries of action data are stored in a remote data host 107. If the identified entries of action data are not stored in a remote data host 107, the remote data manager 208 sends the identified entries of action data to a remote data host 107 for storage. This allows entries of action data to be retained even after being removed from the action cache 104.

Removal of Cached Entries of Action Data

Figure 3:
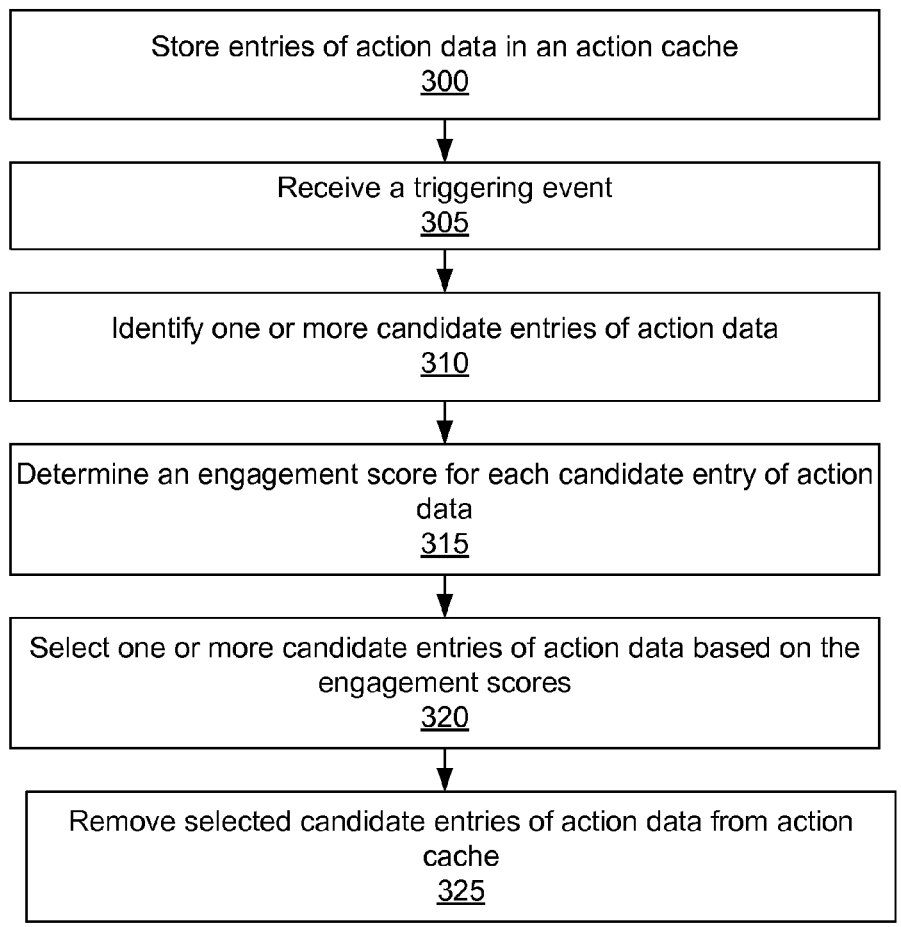
FIG. 3 is a flow chart of a process for purging an action cache, in accordance with one embodiment.

FIG. 3 is a flow chart of one embodiment of a process for removing action data from an action cache 104. As described above, the social networking system 108 stores a plurality of entries of action data in an action cache 104. The entries of action data may be stored 300 as they are generated by the action logger 105 or they may be retrieved from a remote data host 107 and stored in the action cache 104.

The purge module 202 receives 305 a triggering event to remove entries of action data from the action cache 104. As described above, the triggering event may be the action cache 104 reaching a threshold level of capacity, the action cache 104 including a threshold number of entries of action data, or any other suitable event. Candidate entries of action data are then identified 310. For example, candidate entries of action data are identified 310 as entries of action data not prioritized by the rule engine 206 or as entries of action data associated with a date greater than a threshold time from a current time. Other suitable data may be used to identify 310 candidate entries of action data.

An engagement score is determined 315 for each of the candidate entries of action data. As described above in conjunction with FIG. 2, the engagement scores may be determined 315 before receipt of the trigger event or after receipt of the trigger event. In various embodiments, the engagement score is determined 315 for each entry of action data in the action cache 104, or the engagement score is determined 315 for the candidate entries of action data. Based on the engagement scores, one or more candidate entries of action data are selected 320. For example, candidate entries of action data having less than a threshold value are selected 320 or the candidate entries of action data having the lowest engagement score are selected 320. The selected one or more candidate entries of action data are removed 325 from the action cache 104. Selected candidate entries of action data may be sent to a remote data host 107 for storage.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing action data describing actions performed by one or more users of a social networking system, at least a portion of the action data stored as entries in an action cache;
    receiving information about a triggering event to purge the action cache;
    identifying candidate entries from the portion of the action data stored in the action cache;
    determining an engagement score for each of the candidate entries, the engagement score of a candidate entry indicating a probability of a user interacting with a notification based on the candidate entry;
    selecting one or more candidate entries based at least in part on the engagement scores; and
    removing the selected one or more candidate entries from the action cache.

2. The method of claim 1, wherein the engagement score for a candidate entry of action data is based at least in part on prior interactions with a notification based on the candidate entry by users of the social networking system.

3. The method of claim 1, wherein the engagement score for a candidate entry of action data is based at least in part on an affinity between a user requesting a notification and an object associated with the candidate entry of action data.

4. The method of claim 1, wherein determining the engagement score for each of the candidate entries comprises:
    capturing interactions with the notification based on the candidate entry by one or more users of the social networking system; and
    modifying the engagement score of the candidate entry based on the captured interactions.

5. The method of claim 1, wherein the engagement scores are determined responsive to receiving the information about the triggering event.

6. The method of claim 1, wherein the trigger event comprises a number of entries of action data in the action cache reaching a threshold.

7. The method of claim 1, wherein the trigger event comprises an amount of data stored in the action cache reaching a threshold level.

8. The method of claim 1, wherein the trigger event comprises a signal generated based on a rate at which entries of action data are generated.

9. The method of claim 8, wherein determining the engagement score for each of the entries comprises:
    capturing interactions with the notification based on the entry by one or more users of the social networking system; and
    modifying the engagement score of the entry based on the captured interactions.

10. A method comprising:
    storing action data describing actions performed by one or more users of a social networking system, at least a portion of the action data stored as entries in an action cache
    receiving information about a triggering event to purge the action cache;
    determining an engagement score for each of the entries in the action cache, the engagement score of an entry indicating a probability of a user interacting with a notification based on the candidate entry;
    selecting one or more entries based at least in part on the engagement scores; and
    removing the selected one or more entries from the action cache.

11. The method of claim 10, wherein the engagement score for an entry of action data is based at least in part on prior interactions with a notification including the entry by users of the social networking system.

12. The method of claim 10, wherein engagement score for an entry of action data is based at least in part on an affinity between a user requesting a notification and an object associated with the entry of action data.

13. The method of claim 10, wherein the engagement scores are determined responsive to receiving the information about the triggering event.

14. The method of claim 10, wherein the trigger event comprises a number of entries of action data in the action cache reaching a threshold.

15. The method of claim 10, wherein the trigger event comprises an amount of data stored in the action cache reaching a threshold level.

16. The method of claim 10, wherein the trigger event comprises a signal generated based on a rate at which entries of action data are generated.

17. A method comprising:
- storing action data describing actions performed by one or more users of a social networking system, at least a portion of the action data stored as entries in an action cache
- receiving information about a triggering event to purge the action cache;
- applying one or more rules to the entries stored in the action cache to identify one or more candidate entries of action data;
- determining an engagement score for each of the candidate entries, the engagement score of a candidate entry indicating a probability of a user interacting with a notification based on the candidate entry;
- selecting one or more candidate entries based at least in part on the engagement scores; and
- removing the selected one or more candidate entries from the action cache.

18. The method of claim 17, wherein applying one or more rules to the entries stored in the action cache to identify one or more candidate entries of action data comprises:
- prioritizing entries stored in the action cache based on application of the one or more rules; and
- identifying the one or more candidate entries based at least in part on the prioritization.

* * * * *